United States Patent
Zoppas et al.

(10) Patent No.: US 7,841,856 B2
(45) Date of Patent: Nov. 30, 2010

(54) INJECTION SYSTEM HAVING A CLOSING ROD PROVIDED WITH A CLEANING DEVICE

(75) Inventors: Matteo Zoppas, Conegliano (IT); Massimo Rossi, Orsago (IT); Loris Pilat, Follina (IT); Andrea Bazzo, S. Lucia Di Piave (IT)

(73) Assignee: S.I.P.A. Societa Industrializzazione Progettazione E Automazione S.p.A. (IT)

( * ) Notice: Subject to any disclaimer, the term of this patent is extended or adjusted under 35 U.S.C. 154(b) by 179 days.

(21) Appl. No.: 12/063,025

(22) PCT Filed: Aug. 2, 2006

(86) PCT No.: PCT/EP2006/064944

§ 371 (c)(1),
(2), (4) Date: Feb. 5, 2008

(87) PCT Pub. No.: WO2007/017428

PCT Pub. Date: Feb. 15, 2007

(65) Prior Publication Data

US 2008/0226765 A1 Sep. 18, 2008

(30) Foreign Application Priority Data

Aug. 5, 2005 (IT) .......................... RM2005A0430

(51) Int. Cl.
B29C 45/23 (2006.01)

(52) U.S. Cl. .................................................. 425/564
(58) Field of Classification Search ................ 425/562, 425/563, 564, 565, 566, 210, 215, 217
See application file for complete search history.

(56) References Cited

U.S. PATENT DOCUMENTS

| 4,268,240 A | 5/1981 | Rees et al. |
| 4,832,593 A | 5/1989 | Brown |
| 6,196,826 B1 * | 3/2001 | Gellert et al. ............... 425/215 |

FOREIGN PATENT DOCUMENTS

| DE | 102004022036 B3 | 7/2005 |
| EP | 0914924 A | 5/1999 |
| FR | 2837738 A | 10/2003 |

* cited by examiner

*Primary Examiner*—Tim Heitbrink
(74) *Attorney, Agent, or Firm*—Knobbe, Martens, Olson & Bear, LLP

(57) ABSTRACT

Injection system with closing rod (2) provided with a cleaning device (6, 7, 8) suitable for removing the powder of molten plastic that builds up in the movement areas of the closing rod (2), in particular in the thrust bearing (3), during the normal operation of a molding machine. Advantageously the system according to the invention avoids the limitation of the piston stroke and the subsequent blockage with time and thus also the blockage of the closing rod, considerably reducing the number of maintenance operations and thus increasing the productivity of the molding machine.

8 Claims, 2 Drawing Sheets

US 7,841,856 B2

INJECTION SYSTEM HAVING A CLOSING ROD PROVIDED WITH A CLEANING DEVICE

CROSS REFERENCE TO RELATED APPLICATIONS

This application claims the benefit and priority to and is a U.S. National Phase of PCT International Application Number PCT/EP2006/064944, filed on Aug. 2, 2006. This application claims the benefit and priority to Italian Application No.RM2005A000430 filed on Aug. 5, 2005. The disclosures of the above-referenced applications are hereby expressly incorporated by reference in their entirety.

FIELD OF THE INVENTION

The present invention relates to an injection system, in particular to a system for injection molding machines provided with the relative closing rod.

PRIOR ART

There are provided numerous solutions in the prior art for problems regarding the injection systems of molding machines provided with nozzle closing rods.

For example document U.S. Pat. No. 4,832,593, which relates to problems regarding the seal and thermal expansion of large nozzles, also describes a solution to the problem of excess molten plastic material leaking through the duct of the closing rod.

The proposed solution consists of producing a drainage channel for the molten plastic linking the area in which the excess molten plastic is produced with the atmosphere. However, said solution has the disadvantage that the channel is subject to possible clogging, a condition that requires urgent maintenance with the consequent interruption of production.

One problem that has not yet been solved concerns, instead, the removal of the powder of molten plastic material from the movement areas of said closing rods, a problem that is felt more strongly in systems that use vertical presses.

The production of this powder, generally caused by the closing rod moving against the thrust bearing, and the build-up of said powder in the movement areas of said rod disadvantageously lead to a limitation of the pneumatic piston stroke in time until the blockage thereof, not permitting the optimal adjustment of movements of the injection nozzle closing rod. This means that production must be stopped in order to carry out the necessary maintenance and cleaning operations on the actuating system of the injection nozzle closing rod.

Furthermore, the productivity increase of modern injection molding machines, with molding processes pushed to higher limits, leads to even higher stress on the injection molds. During the holding phase, the hot runner channel with the rod closing the nozzle outlet is a pressurized vessel in which the only flow-off is the clearance between the closing rod and the thrust bearing. The higher the pressure that is exerted, the more molten plastic powder is generated. Consequently a scheduled maintenance of the injection systems is required more and more frequently, which results in loss of production.

The need is therefore felt to produce an injection system that overcomes the drawbacks described above.

SUMMARY OF THE INVENTION

A main purpose of the present invention is to produce an injection system provided with a cleaning device suitable for removing the molten plastic powder that builds up in the movement areas of the nozzle closing rod during the normal operation of a molding machine.

Another purpose of the injection system according to the invention is to avoid the limitation of the piston stroke and the subsequent blockage thereof, and thus also the blockage of the closing rod, considerably reducing the number of maintenance operations that are required and thus increasing the productivity of the molding machine.

The present invention achieves the purposes described above with an injection system for molds of plastic material containers provided with a closing rod of the relative injection nozzle, comprising a first end of the rod where actuating means for moving said rod acts, a second end of the rod, suitable for acting as a valve for closing a nozzle outlet, passing through a hot runner channel for the passage of molten plastic material to be injected, a first chamber surrounding said closing rod in an intermediate position between the two ends thereof, characterized in that said first chamber is provided with at least one inlet channel and at least one outlet channel for a pressurized fluid, said channels being arranged in positions so as to generate a turbulent flow of the fluid inside the first chamber the effect of which is to produce a suction effect of any particles contained in said first chamber.

Advantageously the system, according to the present invention, thanks to the structural simplicity of the cleaning device and the use of a simple jet of air, activated cyclically or continuously, automatically or manually, represents an economically convenient solution to the problem of removing the molten plastic powder inside the actuating system of the closing rod.

A further advantage is represented by an appropriate dimensioning of the space in which said powder is deposited, so as to generate an ideal turbulent motion of the compressed air fed into this space to optimize powder removal. In this way all risks of clogging and blockage of the closing rod are eliminated.

The dependent claims describe preferred embodiments of the invention.

BRIEF DESCRIPTION OF THE DRAWINGS

Further characteristics and advantages of this invention will become clear from the following detailed description of preferred, but not exclusive, embodiments of an injection system illustrated, by way of a non-limiting example, with the aid of the accompanying drawings wherein.

DETAILED DESCRIPTION OF PREFERRED EMBODIMENTS OF THE INVENTION

Figure 1:
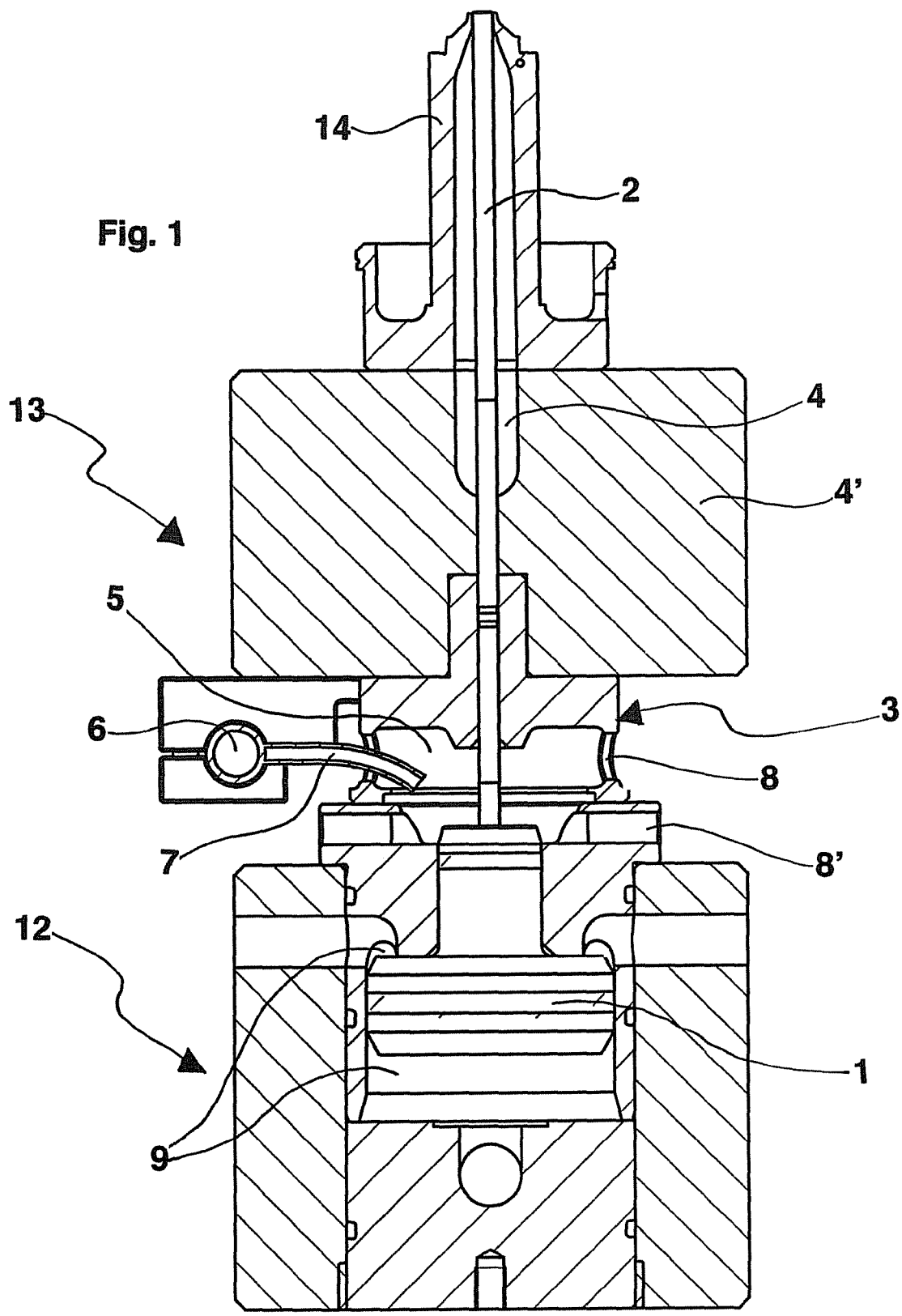
FIG. 1 represents a longitudinal cross-section of an injection system according to the invention.

With reference to the drawings, an injection system provided with a closing rod is illustrated, comprising:

a double-acting pneumatic piston 1,
a closing rod, or simply rod 2, directly connected to said piston,
a thrust bearing 3, that acts as a guide for the rod 2,
an injection nozzle 14 with a hot runner channel 4 through which the molten plastic material flows.

A first part of the injection system, called cold part 12, comprises the piston 1, the relative actuating chamber or cylinder 9, the thrust bearing 3 and the relative housing 5.

A second part of the system, called hot part 13, instead comprises a hot chamber 4', comprising the hot runner channel 4 into which the molten plastic material is fed through a channel, not shown in the drawings, and the injection nozzle 14. The housing 5, arranged between the chamber 9 of the piston 1 and the hot chamber 4', acts as a thermal barrier between said hot part 13 and said cold part 12.

During the operation of the injection molding machine the movement of the rod 2 against the thrust bearing 3 generates powder of molten plastic material. This powder falls by gravity effect onto the bottom of the housing 5 of the thrust bearing 3.

Advantageously the injection system according to the invention is provided with a cleaning device that allows the powder that has built up inside the housing to be removed.

In a first advantageous embodiment of the injection system, illustrated in FIG. 1, said cleaning device comprises a main tube 6 provided laterally with a series of channels 7, each of which has a longitudinal axis preferably but not necessarily perpendicular to the axis of the main tube 6. The number of said channels 7 is the same as the number of cavities in the mold being used and their cross-section is considerably smaller than that of the tube 6.

Each of these channels 7 has one end inside or communicating with the inside of the housing of the respective thrust bearing 3. Said thrust bearing housing, on the side opposite that one in which there is provided the channel 7, is provided with at least one opening or hole 8.

Since the tube 6 is connected to means for generating compressed air (not illustrated in the drawings), a jet of compressed air can be directed along the tube 6 and the channels 7, said jet being activated cyclically or continuously, automatically or manually, and capable of removing the powder deposited inside the housing and of making it go out through the opening 8 in the thrust bearing and/or through an opening 8' arranged in the cold part or block 12 of the injection system.

The presence of a single opening in just one of the components, i.e. the thrust bearing or cylinder, is sufficient.

Advantageously the dimensions of the housing 5 are such as to generate an ideal turbulent motion of the air fed into said housing to obtain a complete removal of the powder by creating a suction effect, obtained by means of an overpressure or vacuum condition.

The housing of the thrust bearing is thus kept clean during molding machine operation, avoiding the limitation of the piston stroke and permitting the optimal adjustment of the position of the rod 2 inside the injection system at all times.

This first embodiment of the injection system is preferably, but not exclusively, used if the closing rod actuating system is open and not sealed.

The main tube 6 for the compressed air delivery can be provided with the channels 7 arranged parallel to one another in the case of nozzles arranged on a matrix-type multiple cavity mold; alternatively the channels 7 may, for example, be arranged radially with the respective axes incident to one another in a point on the longitudinal axis of the tube 6, as in the case of radially arranged multiple cavity molds. In the example in FIG. 1 the inside end of the channel 7 has a curvilinear shape advantageously turned towards the bottom of the housing on which mostly powder builds up.

Figure 2:
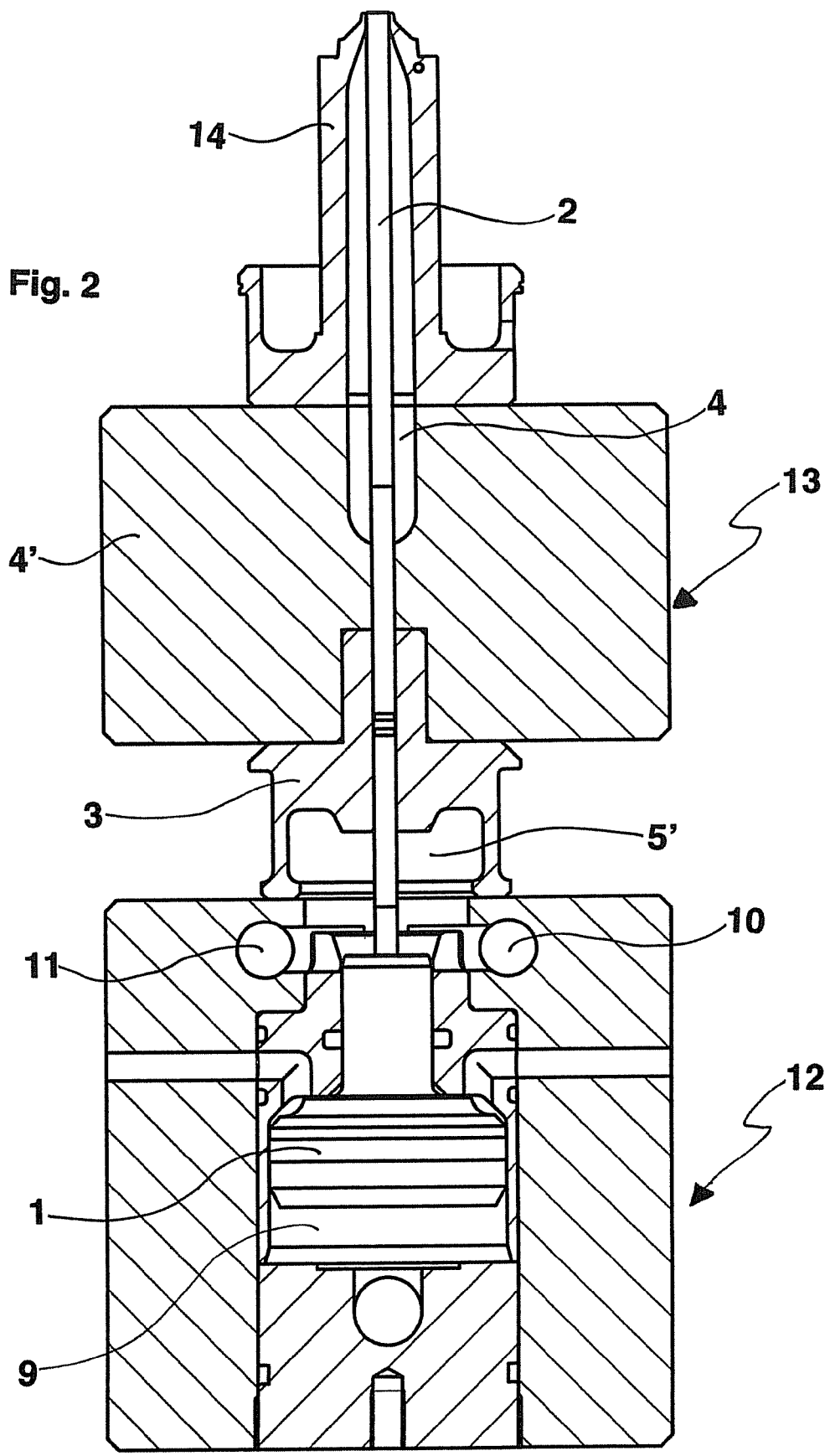
FIG. 2 represents a longitudinal cross-section of an alternative embodiment of the system according to the invention.

A second advantageous embodiment of the injection system according to the invention, illustrated in FIG. 2, is provided with a cleaning device, preferably but not exclusively used in cases in which the actuating system is sealed or closed. Said cleaning device comprises a first hole or channel 10, arranged to one side under the housing 5' of the thrust bearing 3, and a second hole or channel 11 preferably arranged in a symmetrical position with respect to the longitudinal axis of the rod 2 with the first hole 10.

When a jet of compressed air is introduced into the first hole 10, by activating means for generating said air cyclically or continuously, automatically or manually, the compressed air enters the sealed housing 5' removing the powder deposited on the bottom of the housing. This powder, pushed by the introduced air and possibly with the help of a slight vacuum, is sucked out through the second hole 11 and conveyed to a specific vessel that must be emptied at regular intervals. Thus, also in this case, the rod actuating system is kept clean during machine operation, advantageously reducing the number of maintenance operations that are required and subsequently increasing the productivity of the same molding machine.

The injection system, object of the present invention, provided with one of the cleaning devices described above, enables to obtain the best results when arranged in a mold in a position of vertical use with the nozzle outlet facing upwards and the closing rod arranged vertically. Excellent results can also be achieved if the outlet on the nozzle is arranged laterally.

This does not exclude the possibility of installation on molds with different arrangements.

The specific embodiments described in this document are not limitative and this patent application covers all the alternative embodiments of the invention as set forth in the claims.

The invention claimed is:

1. Injection system for molds of plastic material containers, comprising
a nozzle having a closing rod and an outlet
the rod having a first end where an actuator for moving said rod acts,
the rod having a second end, suitable for acting as a valve for closing the nozzle outlet, passing through a hot runner channel for the passage of molten plastic material to be injected, a first chamber formed inside a thrust bearing and surrounding said closing rod in an intermediate position between the two ends thereof, provided with at least one inlet channel and at least one outlet channel for a pressurized fluid, the said channels being arranged in positions so as to generate a turbulent flow of the fluid inside the first chamber the effect of which is to produce a suction effect of any particles contained in said first chamber and said first chamber is arranged between a hot part comprising a hot chamber and a cold part comprising the first end of the rod whereby the first chamber acts as a thermal barrier between the hot part and the cold part.

2. Injection system according to claim 1, wherein said actuator comprises a double-acting piston in a second chamber.

3. Injection system according to claim 2, wherein said first chamber is arranged between said hot runner channel and said second chamber.

4. Injection system according to claim 3, wherein said turbulent flow of the fluid is such that it permits to evacuate plastic material powder from the first chamber.

5. Injection system according to claim 1, wherein said inlet channel comprises a first portion and at least a second portion having a cross-section that is considerably smaller than that of the first portion.

6. Injection system according to claim 5, wherein said second portion is provided with a curvilinear end turned towards the bottom of the first chamber.

7. Injection system according to claim 1, wherein the outlet channel comprises a first opening arranged in the first chamber and/or a second opening arranged in a cold part of the injection system.

8. Injection system, according to claim 1, arranged in a mold in a position of vertical use with the outlet of the injection nozzle arranged upwardly or laterally.

* * * * *